United States Patent Office 2,839,369
Patented June 17, 1958

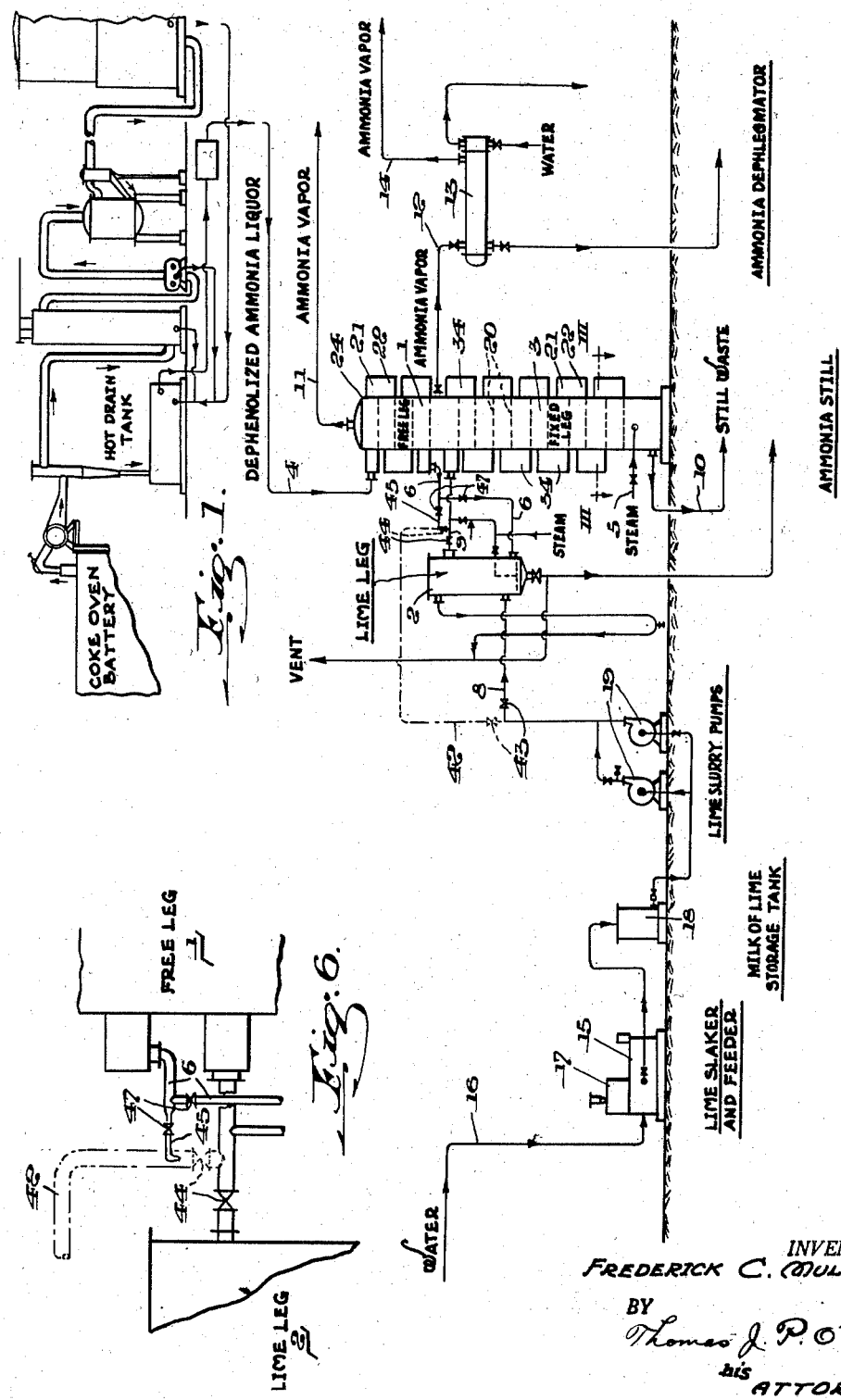

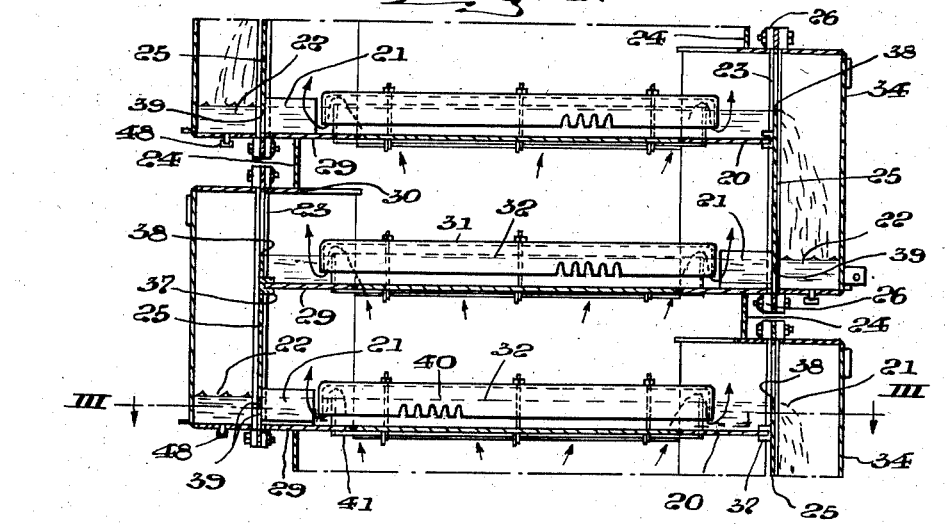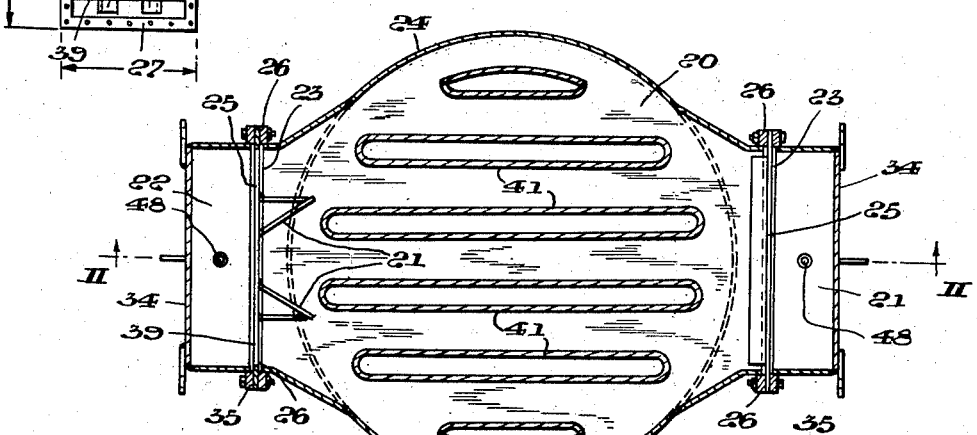

2,839,369

AMMONIA STILL APPARATUS

Frederick C. Mullins, Pittsburgh, Pa., assignor to Koppers Company, Inc., a corporation of Delaware Application June 14, 1956, Serial No. 591,469

6 Claims. (Cl. 23—263)

This invention relates in general to improved apparatus for continuous removal of ammonia from weak ammonia liquor by distillation of the gas liquor derived as condensate from coke oven gas in coke oven by-product recovery systems, and more particularly to improvements in simplification of the construction, operation and maintenance of the ammonia stills as usually and customarily employed in chemical recovery coke plants for this purpose, as exemplified in U. S. Patents to F. Denig, 2,127,503 of 1938 and to Allen and Seyler, 2,263,688 of 1941.

In general, stills designed for this special purpose are commonly constituted of a free leg, lime leg, and fixed leg, with bubble cap trays in the free leg and lime leg for counterflow contact of the gas liquor and stripping steam. As the gas liquor is continuously produced as condensate from the coke oven gas being made and contains both fixed ammonia as well as free ammonia and other volatile acidic constituents such as carbon dioxide, hydrogen sulphide, hydrogen cyanide, tar acids and other constituents such as organic compounds and hydrocarbons, such stills are also provided with means for preparing and continuously introducing lime into mixture with the liquor from the free leg of the still before such liquor passes on into the fixed leg of the still to remove the ammonia from the fixed ammonia compounds in the raw gas liquor before disposal of the continuously produced aqueous condensate as waste water or effluent from the coke plant system by way of discharge into public waterways and streams.

For this continuous supply of lime to the gas liquor, as it continuously flows through the fixed leg from the lime leg of the still, it has been conventional practice to mix the lime with water in a mixer or lime slaker to form milk of lime, and then to continuously pump the lime slurry into the still for continuous reaction with the continuous flow of fixed ammonia compounds still remaining in the gas liquor after passing through the free leg of the still.

With such continuous flow of lime slurry to the still, it is conventionally necessary to have a reserve of the lime slurry, and as the lime is in suspension in the water as calcium hydroxide it has been customarily essential to feed the same from a storage tank, which can be either an integral part of, or a separate unit of, the slaker device, to the liquor and vapor section of the still, which is of a height to accommodate the foaming of the mixture of lime slurry liquor and vapor, and which separates the fixed leg from the free leg of the still, by way of a lime leg of the still wherein larger particles of the lime which may escape the suspension action of the water will settle out before the mixture of gas liquor and lime slurry pass over onto the bubble cap trays, to avoid premature cloggage of the latter and requiring access to the interior of the still to remove the same to avoid all interference with the efficiency of gas and liquid contact on the bubble cap trays and incorrectness of distribution of the liquor such larger particles might set up on the trays.

With such continuous flow of lime there is a progressive accumulation of deposits on the still plates due to the fact that residual carbon dioxide that may escape the stripping action of the steam in the free leg, remains in solution in the gas liquor passing down to, and through, the fixed leg of the still, and such carbon dioxide reacts with the lime instead of the fixed ammonia, such as ammonium chloride, forming a carbonate of lime rather than calcium chloride. This carbonate becomes fixed to the still plates and grows in size due to the binding action of pitch which also forms on the still plates as a residuum of distillation of hydrocarbons or other organic compounds incidentally also present in the original ammoniacal gas liquor.

In general practice, therefore, it is necessary to have access to the interior of the still column, and more particularly to the fixed leg portion thereof, to remove premature impermanent loose sedimentation from the bubble cap trays and from the overflow and inflow weirs and weir traps or compartments, and their connecting piping generally provided on the interior of column. It is also necessary to dismantle the entire still at infrequent intervals to remove the anticipated ultimate mature growths of more permanent nature.

For this purpose such ammonia stills are commonly constituted of superposed cast iron detachable sections with a manhole and often handhole in each section, so that for removal of premature impermanent deposits and for minor adjustments, access may be readily had to the interior of the still column without necessitating total dismantling of the still, until the anticipated infrequent interval for cleaning to remove the expected ultimate growths of more mature and permanent nature.

Such premature cleaning without dismantling of the still sections and the cleaning by dismantling at infrequent intervals are both vexatious, time consuming and very expensive procedures of long standing in this art. Access through the manholes is often accompanied by suffocating and smothering of operating personnel which does not lend itself to prompt and expeditious cleaning when necessary, and is time consuming due to the crowded conditions under which workmen must perform the necessary repairs and cleaning. Complete dismantling often takes three or more weeks to clean and reconstitute the sections to their original working order as a still column during which time crude ammonia liquor has to be either stored if adequate storage tank facilities are available, or dumped into the sewer system of the plant causing contamination of rivers and streams. The usual storage capacity at these plants equals three days production. The still of this invention can be thoroughly cleaned in three days thus avoiding such loss of time and waste of crude ammonia liquor.

The object of the present invention is primarily to provide a still column for this purpose which eliminates these disadvantages and affords access to the interior for such premature cleaning and repair and adjustment in a manner that eliminates the disadvantageous conditions of crowding, smothering and suffocation, and at the same time makes possible the ready and easy access to all parts of the still column for effecting the anticipated cleaning of the ultimate growths of more mature and permanent nature at the expected infrequent intervals without dismantling the still sections and reconstituting the sections as a still column as has heretofore been necessary.

These stills are commonly built in diameters of from three to seven feeet and for adequate distribution of liquid across their plates require internal weir plates of a length of from a minimum of one-half to the whole of the diameter of the bubble cap plates, for overflow, outflow and inflow of the liquid in its countercurrent flow with steam through the column legs. Thus with a seven foot diameter still the weir plates must be of a length of three and one-half to four feet across, and for smaller diameters the weir lengths still must be about the same length of three to four feet. This necessity for three to four foot weirs is regarded as a disadvantage in materially reducing the effective area available on the bubble cap trays for contact of the liquor with the steam. The location of such weir plates on the surface of the bubble cap trays is of further disadvantage in adjustment and replacing them since to do so requires entrance of the hand through a handhole or entrance of one or more persons through a manhole for the purpose. In so doing ready access is to only one side of a tray, the bottom of an upper tray or the top of a lower tray. For access to the top and bottom of each tray physical entrance through manholes of different sections by more than one adjuster is necessary.

The present invention advantageously utilizes the essential disadvantageous length of such weir plates to advantage by utilizing a portion of the outer shell of the still column above and below each bubble cap tray to constitute the overflow weir means for such tray and the inflow weir means for the next tray below. To this end an individual framed access passage is provided for each tray of a minimum length and of height corresponding to at least one-half the diameter of the respective trays. The frame is located at the perimeter of the tray so that each passageway extends from, and is unobstructed from, a region of the base of a subadjacent tray upwardly to a region between the top of the bubble caps of the trays and the base of the tray next above. The frames of the passageways for adjacent superposed trays are disposed at different regions around the axis of the trays, preferably at diametrically opposite sides of the central axis of adjacent trays. This provides a clear and unobstructed passageway affording access concurrently to regions above and below the individual trays from the exterior of the shell with a dimension large enough for the necessary manipulation of equipment to clean said trays with plenty of ventilation in operation to effect the necessary operations involved at infrequent intervals to remove the anticipated ultimate mature growths of more permanent nature, without dismantling and reconstituting the still column as heretofore has been necessary for the purpose, as well as to effect the premature cleaning of the individual sections from the exterior of the shell without entrance through handholes and manholes as has been necessary up to now to remove premature impermanent loose sedimentation.

Such provision for unobstructed openings above and below each tray at opposite sides of the still column provides a more effective cross draft for quick coaling of the still plates and other parts on the interior of the still following a shut down in preparation for cleaning. Heretofore with mere manholes and handholes several days were required for cooling down the still following a shut down in preparation for cleaning. With the present arrangement the cleaning time is lowered, since this quick cooling makes it possible to clean the still more often without dismantling the still. Such cleaning at shorter intervals requires less effort since the deposits are less tenacious and hence the cleaning time and therefore the shut down time is significantly reduced.

For overflow from each tray to the next a box conduit is detachably connected to the frame of each framed access passageway. Said box conduit is likewise of a height and perimetrical length corresponding to the respective frames to correspond with the diameter of the surface of the tray to be of service as its weir, and is attached to the frame of the passageway so as to project beyond the exterior of the shell of the still.

The frames for said passageways are formed integral with the rest of the shell at the perimeter of the trays and have a continuous perimetrical surface for seating a continuous perimetrical seating surface on the box conduit in a gas and liquid tight contact relation therewith.

For control of the overflow through each said access passageway and box conduit a weir plate is detachably connected to each frame intermediate the same and the box therefor. For accuracy in adjusting the weir plates to the bubble caps of the trays to govern the height of liquid about the caps on the trays, each weir plate is constituted of a single plate having a continuous perimetrical seating surface to correspond with the perimetrical seating surfaces of box conduit and frame of the individual framed access passageways. Each plate is of the same three to four foot perimetrical length and height as the frame and box and has perimetrically extending upper and lower slots of three to four feet length for out overflow from each of their trays and inflow to the next subadjacent tray by way of the box conduits that secure the plates to the frame of the respective framed passageways.

These plates may be readily adjusted to alter the levels for the respective trays by replacement by other plates with the slots disposed at different elevations relative to their perimetrical seating surface.

Such adjustment of plates is readily effected solely by access from the exterior of the shell of the still merely by removal of the individual box conduits.

The ready access to the interior of the individual sections of the still by removal of the boxes and weir plates, in addition affords such greater ease and facility of access from the exterior of the shell to the interior of the individual still sections, and more particularly to those sections of the fixed leg thereof, that the continuous introduction of the lime slurry may be advantageously introduced directly to the liquor flowing from the free leg or section to the fixed leg or section without first passing through the usual lime leg section for precipitation of lime particles which do not remain in suspension in the lime water.

Accordingly as a further feature, the present invention contemplates such direct introduction from the storage tank for the lime slurry, or from a separate lime slurry tank, such as a tank integral with the lime mixer or slaker device to the gas liquor by conduit means devoid of decantation means.

Other objects and advantages of the invention will be apparent as it is better understood from the following description when considered in connection with the accompanying drawings illustrating the best mode of practicing the same.

For instance in the present embodiment the invention is incorporated in a system in which the gas liquor has been first processed by known liquid extraction processes to remove phenol from the gas liquor before the ammonical liquor derived from a coke oven plant gas recovery system enters the free leg of the still, rather than by being processed as in the aforesaid Denig and Allen and Seyler processes to remove the phenol from the liquor after it leaves the free leg and before it is mixed with the lime slurry to enter the fixed leg. However, the novel features of the invention are equally applicable with dephenolization as in said patents and also without any dephenolization of the liquor whatsoever. Hence, the invention is not confined to the specific use and specific embodiment herein illustrated as the best mode of attaining the same.

Referring to the drawings:

Fig. 1 is a diagrammatic elevational view of a coke oven ammonia still apparatus constructed in accordance with the present invention;

Fig. 2 is a vertical cross sectional view through the still column of Fig. 1, the section being taken on the line II—II of Fig. 3;

Fig. 3 is a horizontal sectional view taken on the line III—III of Figs. 1 and 2;

Fig. 4 is an exploded vertical cross sectional view of a portion of the column parts shown in Fig. 2.

Fig. 5 is an end elevational view of one of the weir plates;

Fig. 6 is a detail view in vertical cross section of the mixing portion of the conduit means devoid of decantation means for conveying the lime slurry directly into the fixed leg of the still in mixture with gas liquor from the free leg of the still without decantation of the liquor.

As shown in Fig. 1, the ammonia still apparatus is of the form of one of the conventional systems commonly employed for recovering of both the free and fixed ammonia from the aqueous condensate that must be continuously disposed of as effluent in the chemical recovery of by-products from coke plants. Such system comprises a still column with a free leg 1, a lime leg 2, and fixed leg 3. The liquor to be distilled is continuously introduced to the still apparatus from the chemical recovery system for the coke ovens by way of an inlet pipe 4 to the top of the free leg 2 wherein it is stripped of its volatile constituents by means of low pressure steam which is first introduced to the still apparatus by means of a steam inlet conduit 5 at the lower part of the fixed leg 3.

For removal of the ammonia from fixed ammonium compounds, the liquor is withdrawn from the lowermost part of the free leg 1 and introduced to the bottom of the lime leg 2 by means of a conduit 6. In the lime leg 2, the liquor is mixed with lime slurry in which the lime is in suspension, the lime slurry being introduced to the lime leg 2 at its bottom by line 8. The limed liquor overflows at 9 from the top of the lime leg 2 and passes then into the liquor and vapor section of the still at the top of the fixed leg 3 wherein it descends in countercurrent contact with the steam from the line 5, which steam after passing through the liquor in the fixed leg 3 flows on into the bottom of the free leg 1.

The steam in the free leg 1 strips out volatile constituents of liquid therein including carbon dioxide, hydrogen sulphide and free ammonia but does not remove the fixed ammonia. The fixed ammonium compounds react in the lime leg 2 with the lime, releasing the chemically bound ammonia as free ammonia, forming for instance calcium chloride by the reaction of the lime with the fixed ammonia in the form of ammonium chloride. The so liberated ammonia is then stripped off from the limed liquor by the upflow of steam in the fixed leg 3 as the liquor from the lime leg 2 descends through the fixed leg 3.

The residual liquor is discharged from the bottom of the fixed legs 3 as still waste through line 10 and the freed ammonia vapors pass out of the system, along with the $H_2S$, $CO_2$, HCN, etc., from the top of the free leg 1 by way of conduit 11.

In accordance with conventional practice, some of the ammonia vapors from the top of the fixed leg 3 are by-passed around the free leg 1 and taken off by conduit 12 to dephlegmator 13 to separate much of the aqueous content from these ammonia vapors. This forms a more concentrated ammonia vapor for line 14 which is utilized separately from the ammonia vapors taken off through line 11, since those in line 11 contain other volatile constituents such as $CO_2$, $H_2S$, HCN, whereas those taken off through line 14 are practically pure ammonia vapors and as such are utilized, for instance, in neutralizing ammonium sulphate crystals of their residual free sulfuric acid.

Conventionally the lime leg 2 is generally essential in operation of these stills to recover the fixed ammonia, because the exigencies of operation of such stills is such in pracitce that enormous quantities of condensate from the gas of coke plants must be readily, speedily, and completely treated, and this requires the continuous supply of lime slurry to the still.

Such continuous supply necessitates the slaking of lime by a mixer 15 with water fed in by a conduit 16 for reaction with lime fed in by a feeder 17. This necessitates use of a milk of lime slurry storage tank 18 and proportioning pumps 19 for feed of the lime slurry continuously accurately in minute amounts into line 8 for continuous mixing of lime slurry with the continuous flow of gas liquor from the free leg 1 before passage thereof into the fixed leg 3 of the still. As a consequence, the lime leg 2 is essential, with stills as heretofore devised, to decant any lumps or sizes of lime that do not readily remain in suspension as a slurry in the water, to prevent premature clogging of the still plates in the still section 3.

For contact of the stripping steam with the gas liquor, the free leg 1 and fixed leg 3 of the still is, as conventional, equipped with superposed bubble cap trays 20 interconnected with each other for overflow by outflow and inflow weir traps or compartments 22 for serial downflow of the gas liquor across each tray 20 during countercurrent serial upflow of the stripping steam.

In accordance with the present invention, each tray 20 is of the crossflow type, having 100% effective tray area and all the liquor flows completely across the trays from one diametric side to the other of the respective trays. For outflow from each tray 20 and inflow to each next tray during the serial liquor flow, an individual framed access passageway 23 is provided in the shell 24 of the still column for each tray 20. The framed passageways 23 for adjacent superposed trays are disposed preferably at diametrically opposite sides of the shell 24 for complete cross flow of all liquor over each tray 20.

In general these stills are built with trays 20 of seven feet to three feet in diameter, and for efficiency in distribution of the incoming liquor uniformly over all of the tray areas, each tray 20 is provided with an inflow and outflow weir plate 25 usually of a length in ratio to the diameter of the trays of 1–2 up to 1–1 for tray diameters of seven feet down to three feet. As a consequence, each weir plate 25 for each tray 20 takes up considerable of the effective area of each tray 20 which therefore cannot be given over to contact of the liquor with steam. With the stills as commonly employed for ammonia recovery the length of the areas given over to each such weir plate 25 is three feet and the distance between trays is about two feet so that, as shown on the drawing, the distance between the tray above and the tray below every one of the trays is at a minimum of at least three feet.

Accordingly the present invention utilizes this disadvantage to advantage by incorporating the weir traps or compartments and weir plates as a part of the area of the shell 24, rather than as a part of the area of the trays 20. To this end each framed passageway is constituted of a frame 26 firmly united with the shell 24 and of a perimetrical length 27 and height 28 corresponding to the normal weir length requirements for such trays 20. Thus each frame 26 is of a length 27 of about three feet and a height 28 of three feet, which meets the required ratio for weir plates 24 of 1–2 to 1–1 relative to the diameters of these trays 20 as common in this art.

For control of the outflow from each tray and inflow to each next lower tray, the frames 26 are each set at the perimeter of each tray 20 so that each passageway 23 extends from, and is unobstructed for a minimum height of three feet from, a region of the base 29 of a subadjacent tray 20 upwardly to a region 30 between the tops 31 of the bubble caps 32 of the trays and the base 29 of the next tray above.

Each passageway 23 is closed by a box conduit 34 of the same perimetrical length 27 and height 28 disposed at the exterior of the shell 24 and detachably secured to the frame 26 of the passageway 23 through seating surfaces 35. Such box conduits 34 serve, in addition to closing off of the passageways 23, to conduct the overflow from its tray 20 to the next tray 20 below.

To complete the weir action of such portions of the shell 24 of the still column, removable weir plates 25 are detachably connected to said frames 26 through the interposition of their seating surfaces 36 between the frame 26 and the seating surfaces 35 of the box conduits 34.

Each weir plate 25 is likewise of the same perimetrical length 27 as the perimetrical length of the frame 26 and the conduit box 34, that is, in the ratio of 1-2 to 1-1 relative to the diameter of the respective trays 20, for instance three feet at the minimum.

The weir plates 25 are provided with a centering clip 37 for centering the weir plates to their trays 20 and thus have an upper terminal edge 38 and a lower terminal edge 39 for governing overflow and inflow during overflow from each tray to the next. The upper outflow edge 38 of each weir plate controls the level of liquid on the trays and is located at a spaced distance above its centering clip 37 to be in a region between the base 29 of each tray and a level below the portion of the frame 26 immediately above said cap tops 31 of the trays.

The lower inflow edge 39 of each weir plate 25 is located at a spaced distance below the base 29 of the tray 20 of the frame 26 or the centering clip 37 of each plate 25 and at a spaced distance above the portion of the frame 26 that is in the region of the base 29 of the next tray 20 below so that each inflow edge 39 is below the outflow edge 38 of said next tray below, to provide a liquid seal against flow of the steam from the still column into the overflow boxes.

Preferably the weir plates 25 are adjusted to bring the upper outflow edge 38 in horizontal alignment with the tops 40 of the risers or chimneys 41 of its tray and to have the inflow edge 39 at a level below the top of the risers or chimneys of the tray next below. For gas and liquid tightness gaskets 25' are employed between the weir plates and the seating surfaces of the frame and the box conduit.

For ease of access to the interior of the shell for repair, replacement, and cleaning, and to adjust the weir plates 25 as by interchanging them with others having the edges 38, 39 at different elevations from their centering clips 37, the box conduit 34, and weir plates 25 are detachably secured to each other and to the frames 26 by detachable screw bolts 42 as shown in Fig. 4.

The weir plates 25 are also provided with a pair of distributing triangles 21 for equal distribution of entering liquid over the entire tray areas. These triangles are welded to the plates 25 just above their lower terminal edges 39, and are removable with the plates 25.

Each overflow box 34 is also provided with a large individual drain nozzle and access plug 48 accessible from the outside allowing intermittent checking and if necessary removal of lime carryover.

Due to the ease and facility of access to the different still sections 1 and 3 any premature clogging as may result from impermanent deposits resulting from particles of the lime not being small enough to remain in suspension as the lime slurry runs into the fixed leg 3 from the slurry storage tank 18, the present invention provides for advantageously by-passing the lime leg 2 with the slurry from the tank 18 as it is pumped in proper proportion in minute amounts by the proportioning pumps 19 into the fixed leg 3. To this end there is provided conduit means devoid of decantation elements for this purpose in the form of by-pass line 42 from the lime leg feed line 8 to the line 9 for leading the mixture of lime slurry and free ammonia freed gas liquor into the fixed leg 3 of the column still. Valves 43 are provided in the lines 42 and 8, valves 44 are provided in the line 6 to, and the line 9 from the lime leg, to permit such by-pass operation. A branch line 45 from the line 6 from the free leg 1 introduces the free ammonia freed liquor into direct mixture with the lime slurry in the by-pass line 42 from the lime slurry tank 18 in a manner as illustrated in Fig. 6, valves 47 being provided in lines 6 and 45 for this novel gas liquor method of operation.

It will of course be readily understood that the feed of the lime slurry from tank 18 into mixture with the gas liquor from line 6 from the free leg 1, as by branch 42, may be availed of without benefit of the auxiliary coaction of the lime leg 2, which in many cases may be omitted.

In operation the coke oven gas liquor which has been treated by liquid extraction to remove phenol (tar acids) therefrom, is admitted to the free ammonia section 1, consisting of a series of trays equipped with bubblecaps, by means of pipe 4. In the free ammonia section the gas liquor comes into intimate contact with a countercurrent flow of steam which enters the section from the top of the lower fixed leg 3 of the still. The vaporized ammonia and acidic gases such as $CO_2$, HCN, and $H_2S$ ascend through the still section 1 and leave through pipe 11. The gas liquor now stripped of free ammonia flows from still section 1 through pipe 6 by means of which it is forced to mix either in the lime leg 2 or in line 9 with milk of lime slurry or any alkaline material which is brought into this section through pipe 8 or 42. The lime or alkali liberates the fixed ammonia and the mixed liquors flow into the fixed-ammonia still section 3. In this still section the liquid mixture is subjected to further distillation by means of steam, which enters the still through pipe 5, for removal of the previously fixed ammonia, and the vapors evolved pass from the fixed ammonia still section proportioned as preferred through pipe 12 and through the free ammonia section 1 to the mains 11 or 14.

The distilled liquor or still waste is discharged from the bottom of the fixed still through pipe 10 substantially free of noxious impurities and may be disposed of as desired.

In operation, when the lime leg is by-passed, a more rapid contact or quicker response to changing conditions of the proportioning of the lime is attainable, than when the lime leg is employed, since on change in the proportion of lime to water in feeder 15, the change is immediately effective on the liquor from line 45 through line 42, whereas when such change in proportion is made with use of the lime leg 2, by means of line 8, there is a time lag before such change becomes effective on liquor from line 6. In the latter case, the content of the lime leg 2 must clear before the new concentration becomes effective on liquor newly arriving from line 6.

For adjustment of the weir plates or for both frequent cleaning of premature deposits of impermanent nature and infrequent cleaning of mature deposits of a more permanent nature, access is readily and easily had to the interior of the shell from the exterior thereof solely by detaching the bolts 42 and removing the box conduits and weir plates 25, which afterwards may be just as readily and easily installed in a like facile manner.

Complete dismantling of the separate tray sections of the different legs of the still is completely unnecessary for the above purposes. It will also be noted that a greater area of each tray section may be given over to gas and liquid contact due to the location of the weir plates in the shell and the weir traps or compartments on the exterior of the shell in the box conduits.

The invention as herein above set forth is embodied in a particular form of construction but may be variously embodied within the scope of the following claims.

I claim:

1. Coke oven by-product recovery equipment comprising: an ammonia still having a free leg comprising an upper shell portion with superposed bubble cap trays therein and a fixed leg comprising a lower shell portion with superposed bubble cap trays therein with the trays spaced from each other in each leg so that the distance between the tray above and the tray below every one of the trays is a minimum of at least three feet, said fixed leg communicating above its trays with the free leg below its trays for passage of vapors from the fixed leg to the free leg of the still, means for inlet of ammoniacal gas liquor to the still at an upper tray of the free leg, means for off-flow of ammonia vapors from the still at a level above said inlet means to the free leg, means for inlet of steam to the fixed leg below the trays therein, means for continuous withdrawal of gas liquor from a lower tray of the free leg to the exterior of the still shell, means for continuous supply of lime slurry to said withdrawn liquor, means for continuously mixing and introducing said lime slurry and said withdrawn gas liquor to said fixed leg at an upper tray therein, means for withdrawal of ammonia still waste from the fixed leg at a level below the trays therein, and overflow weir means interconnecting said trays for serial downflow of gas liquor over the trays of the free and fixed legs, said overflow weir means comprising framed access passageways individualized each to one of the respective bubble cap trays, each framed passageway comprising a frame which is of a minimum length and height of at least three feet and is firmly connected to the shell portions surrounding the trays at the perimeter thereof, and which provides a passageway that extends from, and is unobstructed from, the region of the base of the next subadjacent tray upwardly to a region between the top of the bubble caps of its respective tray and the base of the next tray above, an overflow conduit for each frame projecting beyond the exterior of the shell and detachably secured to the respective frames individually, said conduits each being of a height and perimetrical length corresponding to the height and length of its frame to correspond with the proportion of the diameter of the surfaces of the trays required for service as their weirs, a weir plate detachably connected to each frame intermediate the same and the conduit therefor, each weir plate being of the same perimetrical length as its frame and having an upper terminal outflow edge and a lower terminal inflow edge with the upper terminal outflow edge located at a spaced distance above the top of the tray individualized to its frame and at a region above said tray and below the portion of the frame above said cap tops of said tray for maintaining a liquid seal at said caps by outflow from the tray to the conduit, and with the lower terminal inflow edge of each weir plate located at a spaced distance below the base of the tray individualized to its frame, at a level above the portion of its frame that is in the region of the base of the next tray below but below the upper outflow edge for the weir plate for said tray below, for inflow from the conduit to said tray below while concurrently sealing off steam vapors from flowing from said tray below to said conduit.

2. Coke oven by-product equipment as claimed in claim 1 and which includes a centering clip on each weir plate in centering engagement with the perimeter of the bubble cap trays to which the frames of the plates are individualized.

3. Coke oven by-product equipment as claimed in claim 1 and in which the aforesaid means for continuously mixing and introducing the lime slurry and gas liquor to the fixed leg comprises means devoid of decantation means for passage of the mixture without decantation interruption into the fixed leg.

4. Coke oven by-product equipment as claimed in claim 1, and in which the aforesaid means for continuously mixing and introdcing the lime slurry and gas liquor to the fixed leg comprises a decanter vessel for decanting particles of a size that would precipitate from suspension during normal flow through the fixed leg.

5. Coke oven by-product recovery equipment comprising: an ammonia still having a free leg comprising an upper shell portion with superposed bubble cap trays therein and a fixed leg comprising a lower shell portion with superposed bubble cap trays therein with the trays spaced from each other in each leg so that the distance between the tray above and the tray below every one of the trays is a minimum of at least three feet, said fixed leg communicating above its trays with the free leg below its trays for passage of vapors from the fixed leg to the free leg of the still, means for inlet of ammoniacal gas liquor to the still at an upper tray of the free leg, means for off-flow of ammonia vapors from the still at a level above said inlet means to the free leg, means for inlet of steam to the fixed leg below the trays therein, means for continuous withdrawal of gas liquor from a lower tray of the free leg to the exterior of the still shell, means for continuous supply of lime slurry to said withdrawn liquor, means for continuously mixing and introducing said lime slurry and said withdrawn gas liquor to said fixed leg at an upper tray therein, means for withdrawal of ammonia still waste from the fixed leg at a level below the trays wherein, and overflow weir means interconnecting said trays for serial downflow of gas liquor over the trays in the free leg and the fixed leg, said overflow weir means comprising framed access passageways individualized each to one of the respective bubble cap trays of the free and fixed legs of the still, each framed passageway comprising a frame which is of a minimum length and height corresponding to at least one half the diameter of their respective trays and is firmly connected to the shell portions surrounding the trays at the perimeter thereof, and which provides a passageway that extends from, and is unobstructed from, the region of the base of the next subadjacent tray upwardly to a region between the top of the bubble caps of its respective tray and the base of the next tray above, an overflow conduit for each frame projecting beyond the exterior of the shell and detachably secured to the respective frames individually, said conduits each being of a height and perimetrical length corresponding to the height and length of its frame to correspond with the proportion of the diameter of the surfaces of the trays required for service as their weirs, a weir plate detachably connected to each frame intermediate the same and the conduit therefor, each weir plate being of the same perimetrical length as its frame and having an upper terminal outflow edge and a lower terminal inflow edge with the upper terminal outflow edge located at a spaced distance above the top of the tray individualized to its frame and at a region above said tray but below the portion of the frame above said cap tops of said tray for maintaining a liquid seal at said caps by outflow from the tray to the conduit, and with the lower terminal inflow edge of each weir plate located at a spaced distance above the portion of its frame that is in the region of the base of the next tray below but below the upper outflow edge for the weir plate for said tray below, for inflow from the conduit to said tray below while sealing off flow of steam vapors from the tray below to the conduit.

6. Coke over by-product recovery equipment comprising: an ammonia still having a free leg comprising an upper shell portion with superposed bubble cap trays therein and a fixed leg comprising a lower shell portion with superposed bubble cap trays therein with the trays spaced from each other in each leg so that the distance between the tray above and the tray below every one of the trays is a minimum of at least three feet, said fixed leg communicating above its trays with the free leg below its trays for passage of vapors from the fixed leg to the free leg of the still, means for inlet of ammoniacal gas liquor to the still at an upper tray of the free leg, means for off-flow of ammonia vapors from the still at a level above said inlet means to the free leg, means for inlet of steam to the fixed leg below the trays therein, means for continuous withdrawal of gas liquor from a lower tray of the free leg to the exterior of the still shell, means for continuous supply of lime slurry to said withdrawn liquor, means for continuously mixing and introducing said lime slurry and said withdrawn gas liquor to said fixed leg at an upper tray therein, means for withdrawal of ammonia still waste from the fixed leg at a level below the trays therein, and overflow weir means interconnecting said trays for serial downflow of gas liquor over the trays of the free and fixed legs said overflow weir means comprising framed access passageways individualized each to one of the respective bubble cap trays of the free and fixed legs of the still, each framed passageway comprising a frame of a minimum perimetrical length and height each of a length in ratio to the diameter of their trays of 1:2 to 1:1 with a minimum of three feet in length, said frames being firmly connected to the shell portions surrounding the trays at the perimeter thereof, and each providing a passageway that extends from, and is unobstructed from, the region of the base of the next subadjacent tray upwardly to a region between the top of the bubble caps of its respective tray and the base of the next tray above, an overflow conduit for each frame projecting beyond the exterior of the shell and detachably secured to the respective frames individually, said conduits each being of a height and perimetrical length corresponding to the height and length of the frames to correspond with the proportion of the diameter of the surfaces of the trays required for service as their weirs, a weir plate detachably connected to each frame intermediate the same and the conduit therefor, each weir plate being of the same perimetrical length as its frame and having an upper terminal outflow edge and a lower terminal inflow edge with the upper terminal outflow edge located at a spaced distance above the top of the tray individualized to its frame and at a region above said tray and below the portion of the frame above the cap tops of said trays for maintaining a liquid seal at said caps by outflow from the tray to the conduit, and with the lower terminal inflow edge of each weir plate located at a spaced distance below the base of the tray individualized to its frame and at a level above the portion of its frame that is in the region of the base of the next tray below but below the upper outflow edge for the weir plate for said tray below, for inflow from the conduit to said tray below while sealing off flow of steam vapors to the conduit.

No references cited.